(12) United States Patent
Steinriede

(10) Patent No.: US 6,957,548 B1
(45) Date of Patent: Oct. 25, 2005

(54) OUTDOOR AIR COOLING APPARATUS AND METHOD

(76) Inventor: Gregory Steinriede, 2534 NE. 9th Ave., #3, Cape Coral, FL (US) 33909

(\*) Notice: Subject to any disclaimer, the term of this patent is extended or adjusted under 35 U.S.C. 154(b) by 0 days.

(21) Appl. No.: 10/620,305

(22) Filed: Jul. 15, 2003

Related U.S. Application Data

(60) Provisional application No. 60/395,679, filed on Jul. 15, 2002.

(51) Int. Cl.[7] ............................................... F28D 5/00

(52) U.S. Cl. ............................................ 62/314; 62/150

(58) Field of Search .................. 62/304, 310, 314, 62/315, 150, 186

(56) References Cited

U.S. PATENT DOCUMENTS

| | | | | |
|---|---|---|---|---|
| 5,143,107 A | \* | 9/1992 | Kelley | 135/16 |
| 5,598,719 A | \* | 2/1997 | Jones et al. | 62/304 |
| 6,161,771 A | \* | 12/2000 | Henry | 239/17 |
| 6,293,121 B1 | \* | 9/2001 | Labrador | 62/304 |

\* cited by examiner

*Primary Examiner*—Melvin Jones
(74) *Attorney, Agent, or Firm*—James M. Deimen

(57) ABSTRACT

In evaporative cooling by injecting extremely fine water droplets into an airstream, the addition of cyclic injection provides superior control of the temperature drop of the air. The cyclic operation of the injection enables effective air cooling of outdoor and semi-outdoor areas, such as outdoor restaurants, even under conditions of high humidity. Small high pressure pumps that can be cycled on and off every few seconds for many millions of cycles make the air cooling method practical and effective.

14 Claims, 3 Drawing Sheets

OUTDOOR AIR COOLING APPARATUS AND METHOD

This application claims the benefit of provisional patent application No. 60/395, 679, filed Jul. 15, 2002.

BACKGROUND OF THE INVENTION

The field of the invention pertains to air cooling and air conditioning apparatus and methods, and, in particular, to cooling semi-enclosed and open air areas where people congregate. These areas are very common in warm and hot climates and somewhat less common, but not unknown, in seasonally warm climates.

Air conditioning, even for fully enclosed areas, remains a very energy intensive activity because the laws of thermodynamics set rigorous limits to efficiencies that can be approached even with excellent insulation. With semi-enclosed or open air areas such as sports arenas, outdoor restaurants, outdoor arenas, roof-only concert facilities and band shells and other outdoor venues, full air conditioning is completely impractical. Therefore, to cool areas without walls or only partial walls, a different approach to air cooling is required such as continuous spraying of water into a blowing airstream.

SUMMARY OF THE INVENTION

The invention comprises improvements in the well known effect of evaporative cooling where air is passed over a water bath, air is passed through a venturi to draw water into the air or water is sprayed into the air. As the water evaporates, the heat of evaporation causes the air temperature to fall noticeably. Unfortunately the result is a noticeable increase in humidity.

Applicant has discovered that by cyclically pumping water at very high pressure through small tubing and nozzles into an air stream, superior cooling without excessive dampness can be created in outdoor and semi-outdoor areas, such as outdoor restaurants. In the simplest application, several nozzles are placed on a fan and connected by very small tubing to a small electric water pump and timing controller. The combination of fan and pump can be controlled to provide continuous operation of both or a time percentage of pump operation during continuous or intermittent fan operation.

Use of the very high pressure water and small nozzles causes a severe pressure drop through the nozzles in turn causing very fine droplets to exit the nozzles. The result is evaporation of water almost instantly, thereby preventing droplets of water from descending on patrons standing and sitting below or nearby. Controlling the water pump cycle permits effective cooling despite ambient conditions of high humidity with high temperature. These pumps may be multiple stage pumps to reach the water pressure required.

Small high pressure water pumps that can be cycled on and off every few seconds for many millions of cycles make the air cooling method practical and effective.

DESCRIPTION OF THE PREFERRED EMBODIMENTS

Figure 1:
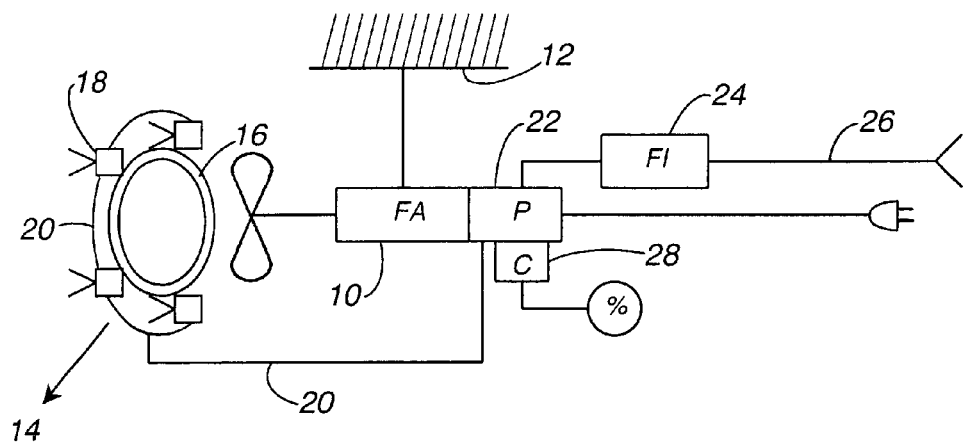
FIG. 1 illustrates schematically a fan and pump having a plurality of separate nozzles thereon.

Illustrated in FIG. 1 is the basic scheme for practicing the invention.

A fan 10 is suspended from the ceiling 12 or upper wall of a semi-enclosed area and directed somewhat downwardly and generally toward an area below to be cooled, such as an outdoor restaurant seating area generally denoted by 14. The fan 10 may also be a freestanding fan. The fan 10 preferably oscillates to provide better moving air distribution over the area generally in front of the fan.

Mounted on open fan grillwork 16 or otherwise in the fan air stream are a plurality of very small nozzles 18 preferably having a venturi internal configuration for best atomization. The nozzles 18 are supplied with high pressure water through one sixteenth inch inside diameter tubing 20. A small vibratory, rotary or piston pump 22 capable of generating 250 to 600 pounds per square inch (psi) of water pressure supplies the nozzles 18. The nozzles 18 are selected with the pump 22 to provide very fine atomization from the combination. The water spray is preferably completely vaporized before it can strike any persons below. The result is a very pleasant cooling effect without the dampness associated with sprays that strike persons before completely evaporating. For example, the water droplets are sprayed through nozzles 18 of 0.008 to 0.072 inches orifice diameter at 250 to 600 psi. The resulting droplet sizes average about 10–25 microns, resulting in evaporation of the droplets in a fraction of a second after ejection from the nozzle. The heat of evaporation is extracted from the air almost instantly, resulting in a very effective cooling of the air without any mechanical refrigeration cycle. Water pressures to 1000 psi have been found effective to properly atomize the water ejected from the nozzles.

Water is fed to the pump 22 through a filter 24 from a reservoir or water line 26. Electrically connected and physically attached to the pump 22 is a controller 28 for setting the percentage of time or cycle for the pump.

For example, the pump controller might be set for 7.5 seconds on and 7.5 seconds off and indefinitely cycle for these time periods. The time periods may be equal or unequal, however, for cyclic operation that preserves proper operation of the pump there are minimum times on and off that can be set. These limits have been set at 1.9 seconds on (2% on) and 1.9 seconds off (98% on). Separate settings provide 100% on and full off for the pump.

Figure 2:
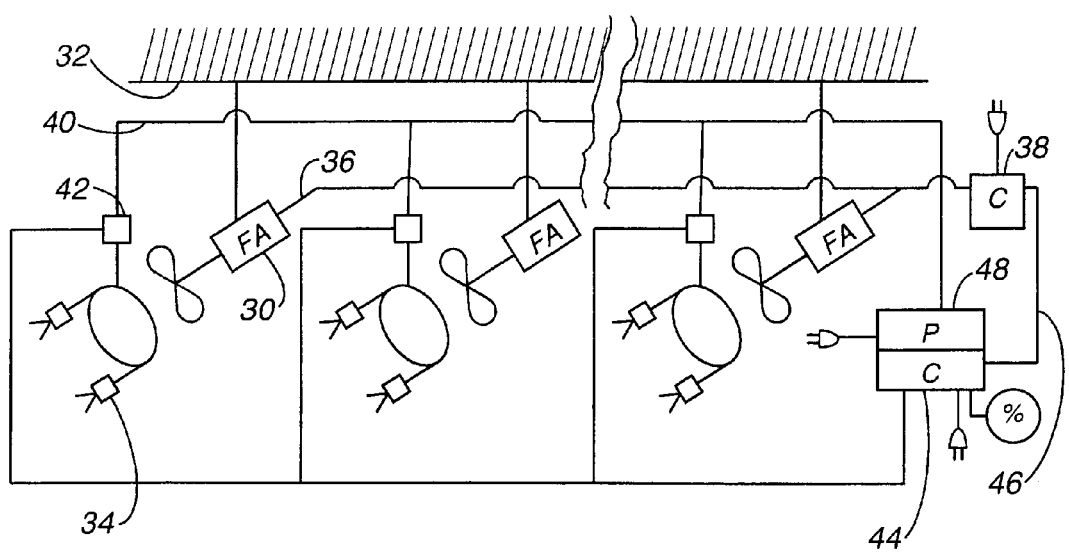
FIG. 2 illustrates schematically a multiple fan installation with nozzles on the fans and single pump supply.

FIG. 2 illustrates a multiple fan installation for a large venue. The fans 30 may be mounted on the ceiling 32 or walls or columns of a pavilion for example. Each fan 30 is equipped with a plurality of nozzles 34 positioned to direct a spray of water droplets into the moving air produced by the fan propellers. The fans 30 are electrically connected 36 to a central controller 38 whereby the fans 30 can be individually controlled, controlled in blocks or controlled as a whole.

The nozzles 34 are supplied through one-sixteenth inch diameter tubing 40 to the individual fans 30 and as required larger tubing to small solenoid valves 42 which control the flow of water to the nozzles on each fan. The small solenoid valves 42 are electrically connected to a second controller 44 whereby the nozzles for each fan can be cycled on and off as required. The two controllers 38 and 44 are coordinated 46 to provide water flow only when the corresponding fan is operating. A single pump 48 supplies the nozzles 34. As many as 50 nozzles 34 can be supplied simultaneously by one or more small electromagnetic pumps or by larger pumps.

Despite the high water pressures (up to 1000 psi) very light weight small diameter plastic tubing can be used along with corresponding small brass fittings. Complicated high or standard (110 v) voltage electrical systems can also be avoided since the solenoidal valves 42 can be 12 or 24 volt valves.

Figure 3:
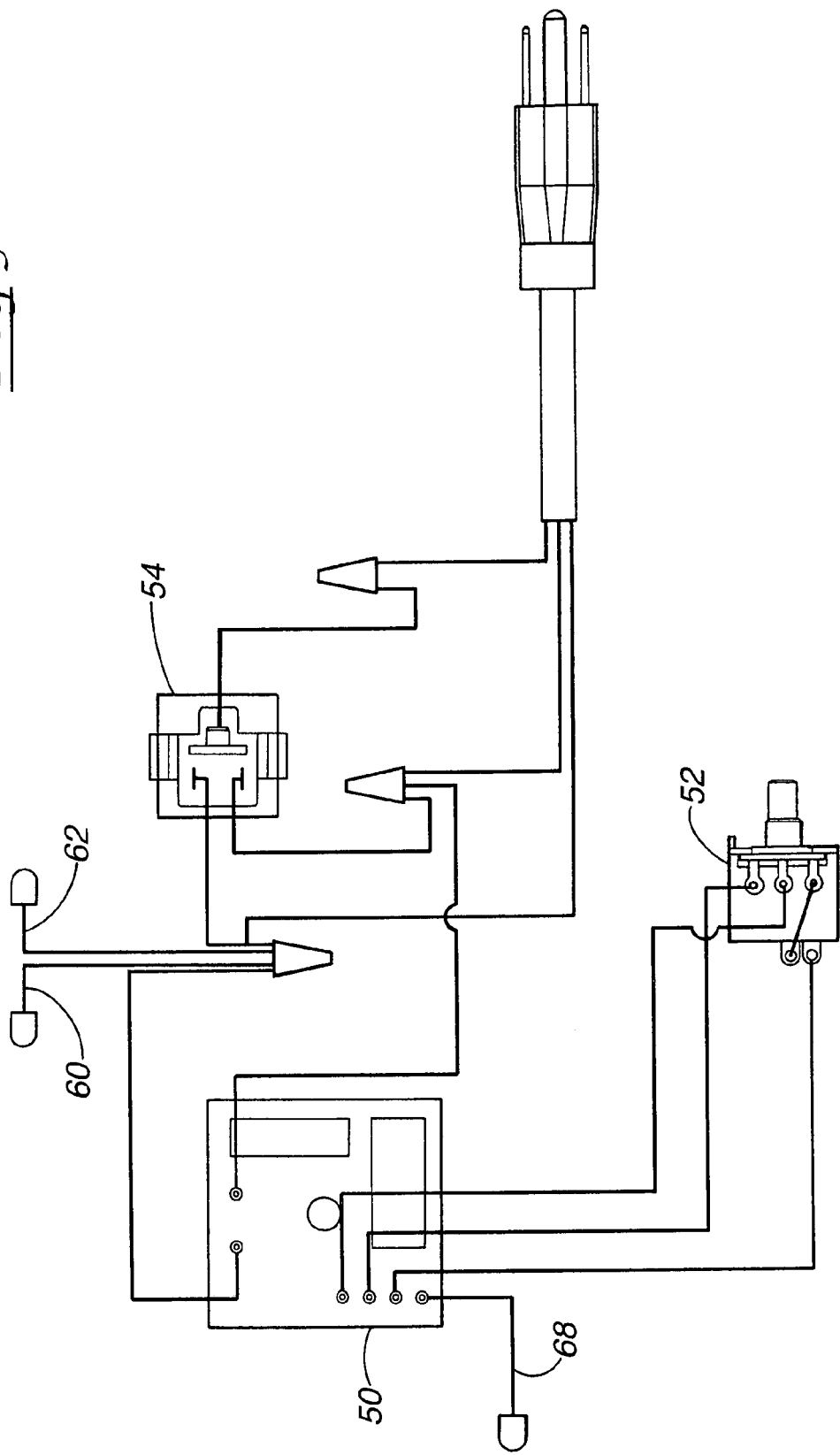
FIG. 3 is a schematic diagram of a cycle controlled installation.
Figure 4:
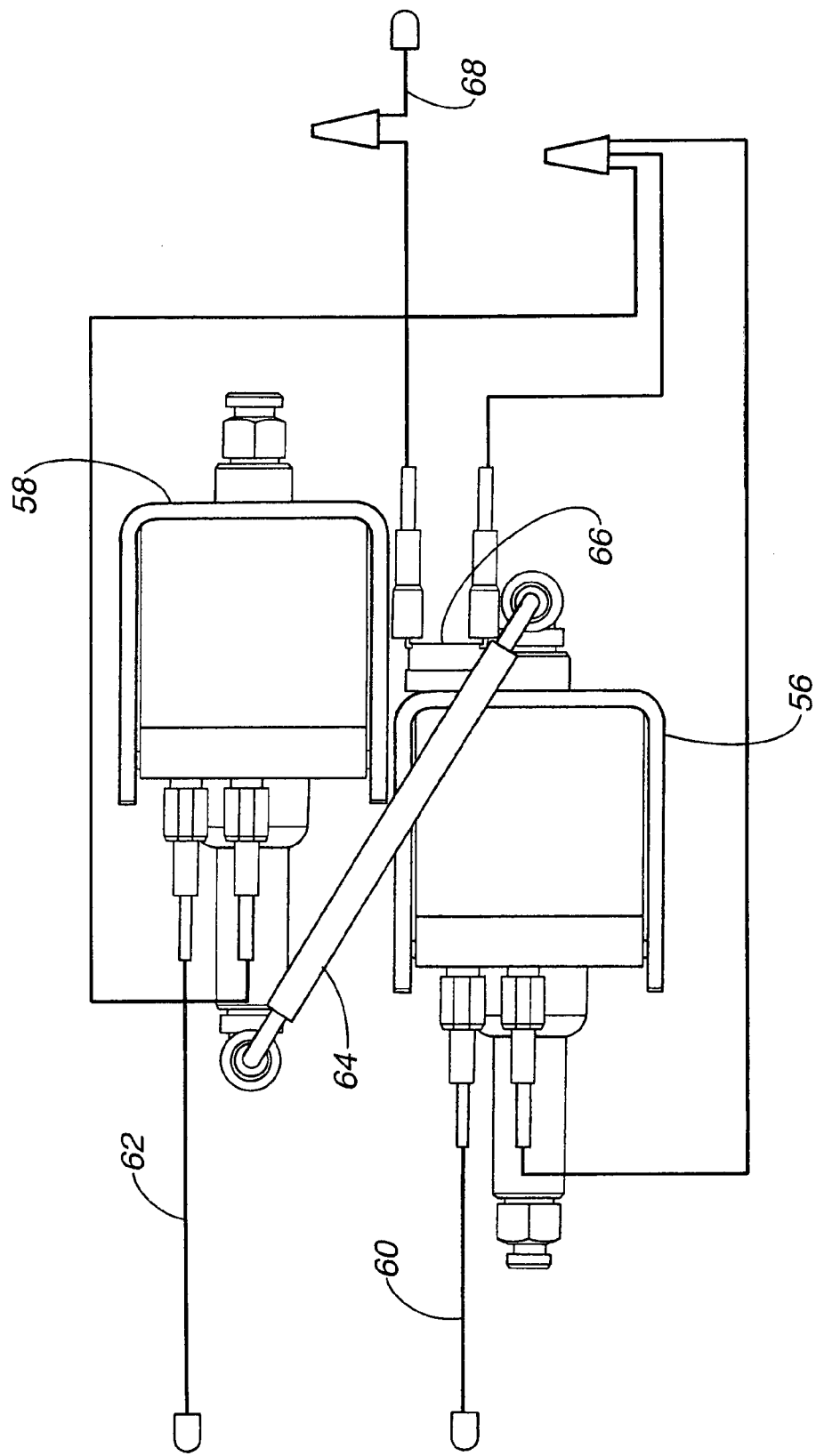
FIG. 4 is a top view of a miniature high pressure dual pump.

Illustrated in FIG. 3 is the schematic of a cycle controller where the fan is on continuously and illustrated in FIG. 4 is the associated dual high pressure pump. In this example the relay timer or controller 50 includes a master switch 52 with a dial knob (not shown) that can be turned to select the cycle time for the controller or turn the controller completely off. Also included is an AC receptacle 54 directly connected to the line cord and into which the fan motor may be plugged.

The controller 50 is connected to the dual pumps 56 and 58 by power lines 60 and 62. Referring to FIG. 4 the pumps 56 and 58 are connected hydraulically in series by the water conduit 64 from the output of pump 56 to the input of pump 58. The pumps 56 and 58 are electrically connected in parallel 60, however, the electrical circuit is in series 68 through overheat protection 66 such as a thermo-couple on pump 56. The entire controller 50, pumps 56 and 58 and switch 52 are contained within a plastic enclosure about five inches on a side and three inches in depth.

Depending on the length of one-sixteenth inches high pressure tubing this particular pump can provide sufficient water to four nozzles on one fan at a minimum or considerably more nozzles or additional fans. For example, 25 to 50 or more nozzles can be suppled with this particular pump and controller described above. Through testing and experience and depending on prevailing wind conditions each nozzle is effective at cooling 100 square feet of venue. With the large number of nozzles that can be supplied by the above pump and controller which draws about 46 watts of electric power, a very large venue can be cooled at the equivalent electric cost of a small incandescent light bulb. Most important, the cooling is effective at high humidity (above 85%) with high temperature (above 90 degrees F.). By purposefully cycling the apparatus, cooling can be effected without increasing the level of humidity sensible to individuals within the cooled venue.

What is claimed is:

1. An apparatus for cooling air in an outdoor venue comprising a means for causing a flow of air in the outdoor venue,
    at least one nozzle positioned to direct a spray of water into the flow of air,
    a high pressure electric water pump in communication with a source of water and a water conduit connecting the pump to the nozzle,
    a selectable controller in electric communication with the water pump, the selectable controller adapted to timewise cycle the pump on and off periodically, and
    wherein the water conduit is approximately one-sixteenth inches in inside diameter.

2. The apparatus of claim 1 wherein the means for causing a flow of air comprise at least one fan, said at least one nozzle attached to the fan.

3. The apparatus of claim 1 wherein the means for causing a flow of air provides a continuous flow of air in the outdoor venue.

4. The apparatus of claim 3 wherein the selectable controller can selectably provide for continuous spray of water or a full cycle of about fifteen seconds.

5. The apparatus of claim 3 wherein the selectable controller can provide a pump on timewise period differing from the pump off timewise period.

6. The apparatus of claim 1 comprising a plurality of means for causing a flow of air and a plurality of nozzles positioned to direct sprays of water into each of the plurality of means for causing a flow of air.

7. The apparatus of claim 6 including a plurality of water conduits connecting the pump to the plurality of nozzles.

8. An apparatus for cooling air in an outdoor venue comprising a means for causing a flow of air in the outdoor venue,
    at least one nozzle positioned to direct a spray of water into the flow of air,
    a high pressure electric water pump in communication with a source of water and a water conduit connecting the pump to the nozzle,
    a selectable controller in electric communication with the water pump, the selectable controller adapted to timewise cycle the pump on and off periodically, and
    including means to cycle the air flow on and off and means to coordinate the on and off cycle of the pump with the on and off cycle of the means to cycle the air flow.

9. A method of cooling air in outdoor venues comprising the steps of:
    causing a flow of air in an open space of the outdoor venue,
    spraying water into the flow of air by pumping the water at high pressure through at least one nozzle to disperse the water in very small droplets,
    selectably spraying the water cyclically as a function of time in response to perceived ambient temperature and humidity, and
    wherein the flow of air is periodically cycled on and off and the spraying of water is cycled on during the on cycle of the air.

10. The method of claim 9 wherein the very small droplets evaporate to a gaseous state within one section of ejection from the nozzle.

11. A method of cooling air in outdoor venues comprising the steps of:
    causing a flow of air in an open space of the outdoor venue,
    spraying water into the flow of air by pumping the water at high pressure through at least one nozzle to disperse the water in very small droplets,
    selectably spraying the water cyclically as a function of time in response to perceived ambient temperature and humidity, and
    wherein the droplet size of the very small droplets average substantially 10–25 microns.

12. A method of cooling air in an outdoor venue comprising the cyclic injection of water droplets into a flow of air directed into the outdoor venue, said water droplets sized to evaporate within one second after injection and
    wherein the water droplet sizes average substantially 10–25 microns.

13. The method of claim 12 wherein the cyclic injection of water of water droplets is timewise adjustable.

14. A method of cooling air in an outdoor venue comprising the cyclic injection of water droplets into a flow of air directed into the outdoor venue, said water droplets sized to evaporate within one second after injection, and
    wherein the cyclic on-time injection of water droplets is adjustable relative to the cyclic off-time non-injection of water droplets.

* * * * *